United States Patent
Silver et al.

[11] Patent Number: 5,828,949
[45] Date of Patent: Oct. 27, 1998

[54] RADIO TELECOMMUNICATIONS NETWORK AND METHOD OF SUPPORTING OPERATION OF A COMBINED MOBILE TELEPHONE AND PAGER

[75] Inventors: Andrew Silver, St. Luc; Donald Joong, Montreal, both of Canada

[73] Assignee: Telefonaktiebologet LM Ericsson (publ), Stockholm, Sweden

[21] Appl. No.: 677,876

[22] Filed: Jul. 10, 1996

Related U.S. Application Data

[63] Continuation-in-part of Ser. No. 579,005, Dec. 27, 1995.

[51] Int. Cl.⁶ ..................................................... H04Q 7/38
[52] U.S. Cl. ..................... 455/38.3; 455/31.2; 455/31.3; 379/170
[58] Field of Search .................................. 455/31.2, 31.3, 455/426, 38.3; 379/89, 170

[56] References Cited

U.S. PATENT DOCUMENTS

| H610 | 3/1989 | Focarile et al. ............................ 379/60 |
| 4,661,972 | 4/1987 | Kai ............................................. 379/57 |
| 4,747,124 | 5/1988 | Ladd ......................................... 379/67 |
| 5,148,473 | 9/1992 | Freeland et asl. ......................... 379/59 |
| 5,153,903 | 10/1992 | Eastmond et al. ......................... 379/57 |
| 5,175,758 | 12/1992 | Levanto et al. ............................ 379/57 |
| 5,247,700 | 9/1993 | Wohl et al. .............................. 455/33.1 |
| 5,274,843 | 12/1993 | Murai et al. ............................ 455/38.3 |
| 5,392,452 | 2/1995 | Davis ...................................... 455/38.1 |
| 5,414,750 | 5/1995 | Bhagat et al. ............................ 379/57 |
| 5,418,835 | 5/1995 | Frohman et al. ......................... 379/57 |
| 5,537,457 | 7/1996 | Lantto et al. ............................. 379/58 |
| 5,541,976 | 7/1996 | Ghisler ..................................... 379/57 |
| 5,568,654 | 10/1996 | Fukawa ................................... 455/33.1 |
| 5,592,533 | 1/1997 | Mchenry et al. ......................... 379/58 |
| 5,621,729 | 4/1997 | Johnson et al. .......................... 370/62 |
| 5,659,596 | 8/1997 | Dunn ...................................... 455/456 |
| 5,711,006 | 8/1995 | Brochu et al. ........................... 455/445 |

FOREIGN PATENT DOCUMENTS

| 0503813A2 | 9/1992 | European Pat. Off. . |
| 0514360A2 | 11/1992 | European Pat. Off. . |
| 2280086 | 1/1995 | United Kingdom . |

*Primary Examiner*—David R. Hudspeth
*Assistant Examiner*—Daniel Abebe
*Attorney, Agent, or Firm*—Steven W. Smith

[57] ABSTRACT

The present invention is a method within a radio telecommunications network for delivering a telephone call to a mobile station having a telephone portion, a pager portion, and a relay switch between the telephone portion and the pager portion. Data indicating that the mobile station is capable of receiving standard paging messages from a paging network is recorded in a home location register (HLR) associated with the mobile station. The method enables a subscriber to turn off the telephone portion to conserve battery power. When a call is received in a cellular network for the mobile station, and the mobile station cannot be contacted, the cellular network requests an associated paging network to send a page to the pager portion. The paging network is requested to page the pager portion of the mobile station via a datalink from the cellular network. The pager portion then activates the telephone portion through the relay switch, and the cellular network completes the call.

8 Claims, 10 Drawing Sheets

FIG. 4
FIG. 5
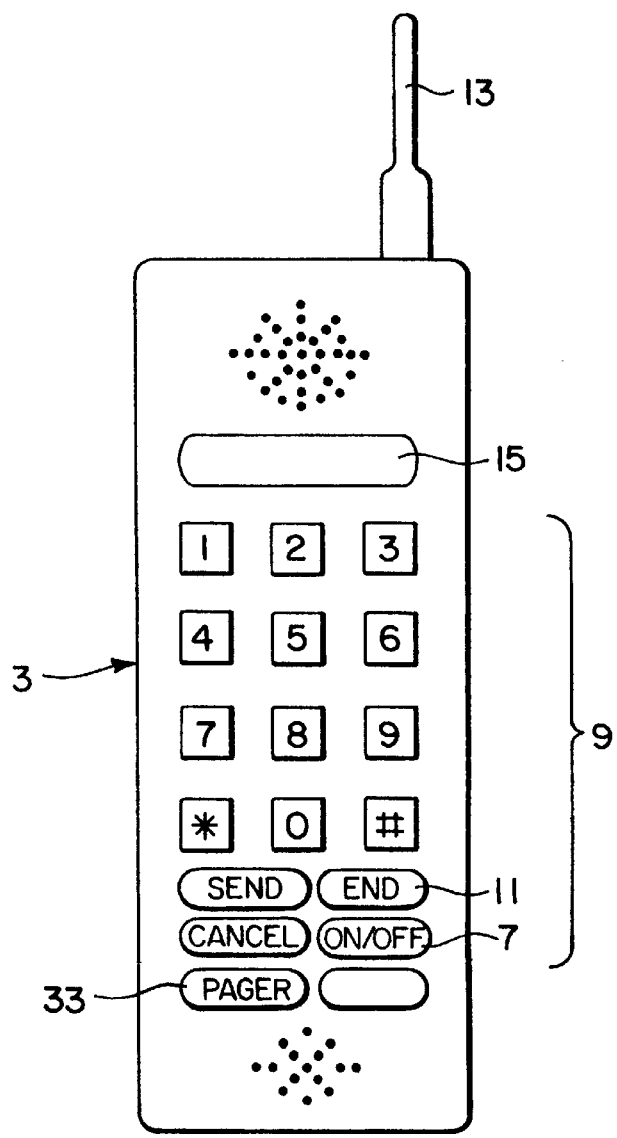
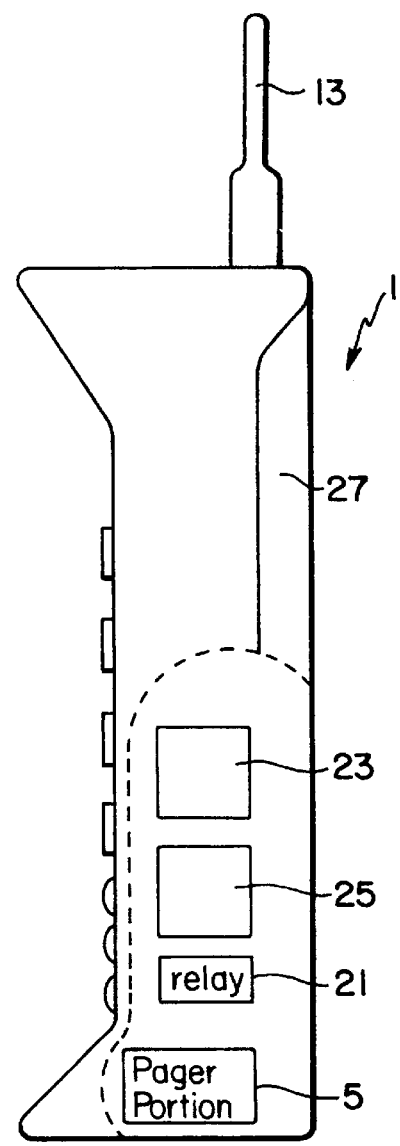

RADIO TELECOMMUNICATIONS NETWORK AND METHOD OF SUPPORTING OPERATION OF A COMBINED MOBILE TELEPHONE AND PAGER

RELATED APPLICATIONS

This application is a Continuation-in-Part of co-pending U.S. patent application Ser. No. 08/579,005 filed Dec. 27, 1995.

BACKGROUND OF THE INVENTION

1. Technical Field of the Invention

This invention relates to radio telecommunication systems and, more particularly, to a radio telecommunications network and method of supporting operation of a combined mobile telephone and pager.

2. Description of Related Art

In modem mobile telecommunications systems, two major groups of products co-exist on the market: mobile telephony systems and paging systems. Mobile telephony systems are used by mobile telephone subscribers moving throughout the coverage area of the mobile telephony system utilizing mobile telephones referred to as mobile stations. The coverage area of the mobile telephony system is composed of a group of cells. Each cell broadcasts over a small area and is adapted to transmit and receive communication signals with several users at the same time on an ongoing basis. When a subscriber is moving throughout different cells, the communication signals are handled sequentially by the cells in which the subscriber is passing. The communications signals are sent continuously during a call, and regularly when the mobile phone is turned on but not on a call. Of course, this continuous and regular sending of communications signals requires energy.

The second group, paging systems, typically has one wide cell which covers the whole paging area where paging subscribers can receive short message pages. The pager is always turned on to "listen" to short message pages, and to receive the ones that are dedicated to it. Thus, a small quantity of energy is used continuously to listen, and a greater quantity of energy is used only upon receipt of an incoming short message page.

Subscribers greatly appreciate the flexibility offered by mobile telephone systems, and mobile stations are being used for an ever increasing number of applications. However, mobile stations do not offer extensive period of power autonomy since the station is either continuously or regularly sending communications signals. On the other hand, paging systems do not offer the same flexibility as mobile stations for the types of services offered, but the power autonomy of pagers is much better than that of mobile stations. Therefore, it would be a great advantage to combine the power autonomy of pagers to the flexibility of mobile stations.

Although there are no known prior art teachings of a solution to the aforementioned deficiency and shortcoming, U.S. Pat. No. 5,392,452 to Davis; U.S. Pat. No. 5,247,700 to Wohl et al.; U.S. Pat. No. 5,175,758 to Levanto et. al.; U.S. Pat. No. 4,661,972 to Kai; U.S. Pat. No. 5,148,473 to Freeland et al.; U.S. Pat. No. 5,153,903 to Eastmond et al.; U.S. Pat. No. 5,418,835 to Frohman et al.; and U.S. Statutory Invention Registration No. H610 discuss subject matter that bears some relation to matters discussed herein.

U.S. Pat. No. 5,392,452 to Davis discloses a selective call signaling system with combined wide area paging and high data rate transmissions via radio telephone transceivers. More precisely, this patent describes a paging system which cooperates with a radio telephone system. This combination provides conventional delivery of short paging messages via a first communication path, while a radio telephone link is used to deliver large data messages to a combined pager/radio telephone. The system of Davis reduces the paging load on the radio telephone link. Davis, however does not teach or disclose a system or a method for improving power autonomy for such combined radio telephone transceiver and pager.

U.S. Pat. No. 5,247,700 to Wohl et al., which discloses a combined mobile telephone with pager which forms an internally updated roaming pager. Mobile telephone location information is automatically conveyed by a mobile block to a paging service, thus allowing the paging service to know the location of the paging receiver, allowing in turn, the pager to wait for a page at a single frequency. Wohl thereby eliminates frequency scanning by the pager or manual updates by the user. Wohl, however, does not teach or suggest a combined mobile telephone and pager which provides greater power autonomy to the mobile telephone.

U.S. Pat. No. 5,175,758 to Levanto et al. discloses an integrated mobile telephone system and paging network in which the paging network is used to page a called mobile telephone. When calling the mobile telephone, the transmitter of the paging range in which the telephone is located, or assumed to be located, transmits a paging message to the telephone. When the telephone enters a cell of the mobile telephone system, the mobile telephone system establishes immediately a connection between the subscribers. However, Levanto does not teach or suggest a combined mobile telephone and pager which improves the power autonomy of the mobile telephone.

U.S. Pat. No. 4,661,972 to Tomokazu Kai discloses a mobile telephone system for automatically paging a mobile subscriber. This system includes a mobile telephone system and a paging system which cover an identical service area, which are independently operated, and which are connected through an exchange. A mobile telephone includes a telephone set connected to a radio transmitter/receiver and an automatic pager calling circuit, the latter having a circuit for detecting and storing an indication that an incoming call is being made to the mobile subscriber. A pager number signal for the radio transmitter/receiver is automatically sent by the paging system to the pager through the exchange, thereby calling the mobile subscriber. Thus, Kai reduces the paging load. However, it does not disclose or suggest a combined mobile telephone and pager which improves the mobile telephone power autonomy.

U.S. Pat. No. 5,148,473 to Freeland et al. discloses a combined pager and radiotelephone apparatus. This apparatus has a radio pager section and a mobile radiotelephone section. Received pages are stored in the pager section until the user acknowledges their receipt by a keystroke, which transfers the pages to the radio telephone section and stores them in a non-volatile memory for later use. Freeland also describes an apparatus to reduce paging load, but it does not teach or suggest a system and method to improve the mobile telephone power autonomy.

U.S. Pat. No. 5,153,903 to Eastmond et al. discloses an integrated paging and radiotelephone system that improves the reliability of the paging system by first detecting when a call is in progress with a personal communication transceiver portion of a portable communication device. Paging is inhibited while the call is in progress, but is delivered upon termination of the call. Eastmond, however, does not teach or suggest a method of utilizing a paging signal to activate an inactive mobile telephone portion of a combined mobile telephone and pager.

U.S. Pat. No. 5,418,835 to Frohman et al. discloses a paging system that converts undeliverable paging messages to voice mail for later delivery through a cellular communication system. However, Frohman does not teach or suggest a method of utilizing a paging signal to activate an inactive mobile telephone portion of a combined mobile telephone and pager.

U.S. Statutory Invention Registration No. H610, published on Mar. 7, 1989 discloses a mobile pager. As it is known in the art, a special set of geographically dispersed channels in the advanced mobile phone service system are dedicated nation-wide to signaling and call control functions. These channels are used by the pager to properly configure itself to receive a page signal. The pager scans these channels, tunes to the channel with the best received signal strength and synchronizes with a received data stream on this or a second best channel. Paging service to subscribers in a mobile radio system is provided by the pager when the full service of a mobile telephone is not desired. Alternatively, in this mobile pager, the pager is assigned the same number as an associated mobile telephone for providing a backup for telephone calls intended for the associated mobile telephone which is not "ON". This invention registration discloses an alternate paging scheme. However, it does not suggest or teach a system or method using a combined mobile telephone and pager which improves the mobile telephone power autonomy.

Several patents describe ways of reducing mobile paging load on a radio telephone link, while others describe using a pager in combination with a mobile telephone as a backup when the mobile telephone is off. Review of each of the foregoing references reveals no disclosure or suggestion of a system or method such as that described and claimed herein.

In order to overcome the disadvantage of existing solutions, it would be a distinct advantage to have a system and method in which a mobile telephone would be combined with a pager to improve the mobile telephone power autonomy. The present invention provides such a system and method.

SUMMARY OF THE INVENTION

The present invention is a method within a radio telecommunications network of delivering a telephone call to a mobile station having a telephone portion, a pager portion, and a relay switch between the telephone portion and the pager portion. The radio telecommunications network has a cellular network and a paging network. The switch is a mechanism that causes activation of a secondary device from a first device. The method begins with the steps of recording in a home location register (HLR) associated with the mobile station, data indicating that the mobile station is capable of receiving standard paging messages from the paging network; receiving the telephone call in the cellular network; determining whether the mobile station is inactive; and determining from the data in the HLR whether the mobile station is capable of receiving standard paging messages, upon determining that the mobile station is inactive. These steps are followed by requesting the paging network to page the pager portion of the mobile station, upon determining that the mobile station is capable of receiving standard paging messages; receiving, in the pager portion, the page from the paging network; activating the telephone portion through the relay switch in response to receiving the page in the pager portion; and routing the call to the mobile station.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 4 is a front elevational view of a combined mobile phone and pager of the present invention according to a second embodiment;

FIG. 5 is a side elevational view of the mobile phone/pager of FIG. 4 partially cut away to illustrate internal components;

DETAILED DESCRIPTION OF EMBODIMENTS

Figure 1:
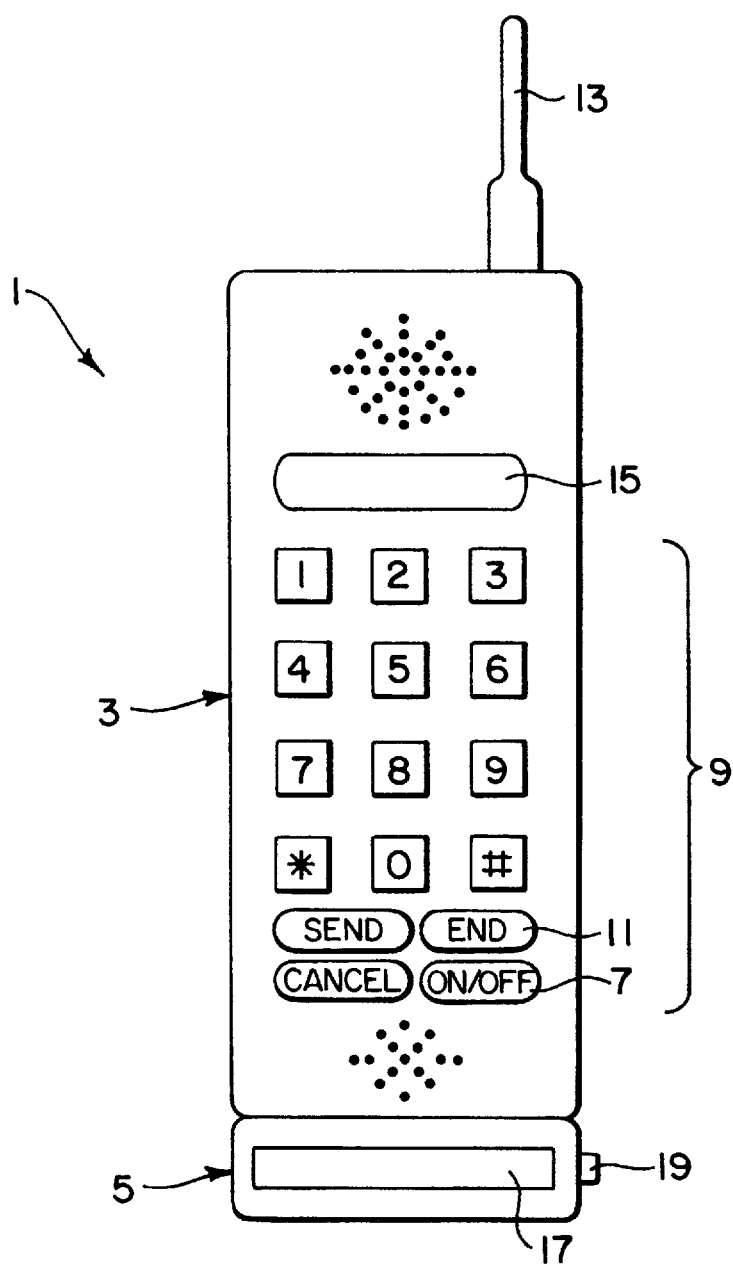
FIG. 1 is a front elevational view of a combined mobile phone and pager of the present invention according to a first embodiment.

Referring to FIG. 1, there is shown a front elevational view of a combined mobile phone and pager 1 according to a first embodiment of the present invention. The mobile phone/pager 1 has a mobile phone portion 3 and a pager portion 5.

The mobile phone portion 3 includes an on/off switch 7, a keypad 9, an end button 11, an antenna 13 and a display 15. The on/off switch 7 may be implemented as a button on the keypad 9 as shown in FIG. 1, but may also utilize other types of on/off switches. The keypad 9 may be utilized by a user to input digits of a called phone number. The display 15 may be a Liquid Crystal Display such as those widely used on mobile phones. The mobile phone portion 3 may be a portable mobile phone, a mobile car phone, a foldable mobile phone, or any other type of mobile phone known in the art. The mobile phone portion 3 may also be provided with other features and accessories without departing from the scope of the present invention.

The pager portion 5 may be a standard pager for receiving paging signals from a paging network. The pager portion 5 may optionally be equipped with a receiving display 17 and a receipt button 19. If a receiving display 17 and a receipt button 19 are provided, the receiving display 17 may indicate a phone number of a calling party or a message as is known in the paging art. The pager 5 may also have other features and accessories which are not described herein.

Figure 2:
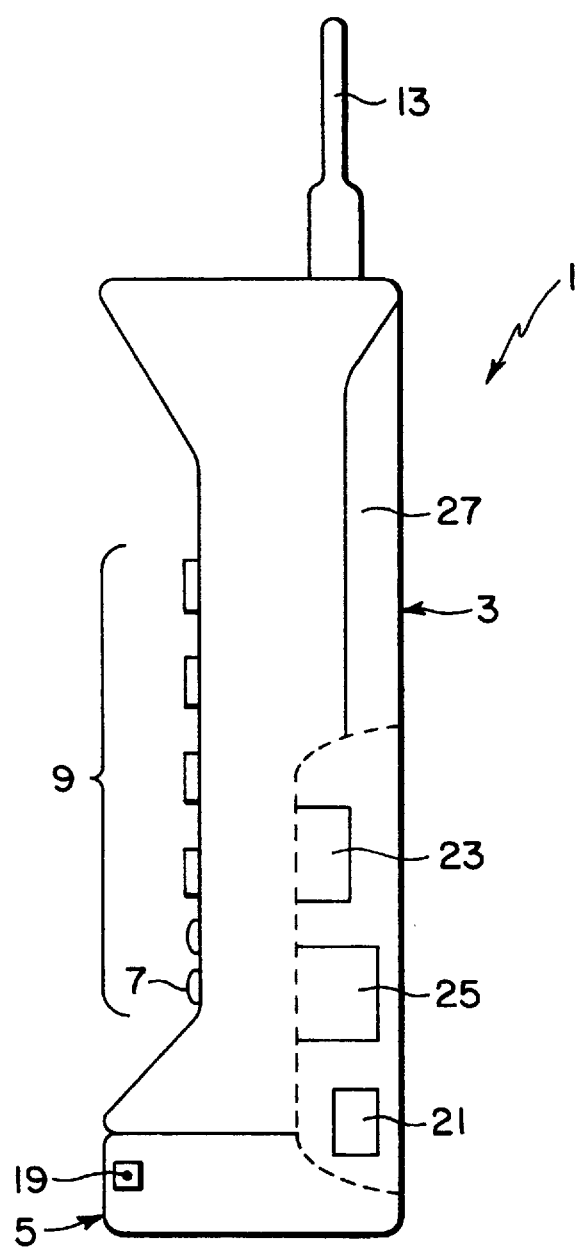
FIG. 2 is a side elevational view of the mobile phone/pager of FIG. 1, partially cut away to illustrate internal components.

Referring now to FIG. 2, there is shown a partially cut away side elevational view of the combined mobile phone/pager 1 of FIG. 1. The mobile phone portion 3 further includes a relay 21, a transmitter/receiver 23, a processor 25 and a power supply 27. The relay 21, also referred to throughout the disclosure and the claims as an activating switch, is operationally connected between the pager portion 5 and the on/off switch 7, in such a manner that the on/off switch 7 is turned on in response to the pager portion 5 receiving a paging signal. The relay 21 may comprise an electro/mechanical relay, an optical relay, an electronic relay, or any other type of relay capable of activating an electronic switch.

The transmitter/receiver 23 transmits and receives radio phone calls as is known in mobile phones. The processor 25 is connected to the keypad 9 and to the transmitter/receiver 23, where it can establish or receive a call through the transmitter/receiver 23. The power supply 27 provides energy for both the pager portion 5 and the mobile phone portion 3. The power supply 27 may be, for example, batteries, rechargeable batteries, an adaptor plugged in a car lighter, or an adaptor plugged in an electric plug. The power supply 27 may also be divided in two independent parts, with one of the parts energizing the pager portion 5, and a second part energizing the mobile phone portion 3.

Upon receipt of a paging signal by the pager portion 5, the relay 21 is activated, which turns on the mobile phone portion 3 of the mobile phone/pager 1.

Alternatively, the relay 21 may also be connected to the power supply 27 and to the pager portion 5, and upon receipt of an incoming paging signal, the relay 21 may activate energizing of the transmitter/receiver 23, the keypad 9, and the processor 25.

When the mobile phone portion 3 of the mobile phone/pager 1 is activated by the pager portion 5, the mobile phone portion 3 performs a registration procedure with the mobile telephone network.

Figure 3:
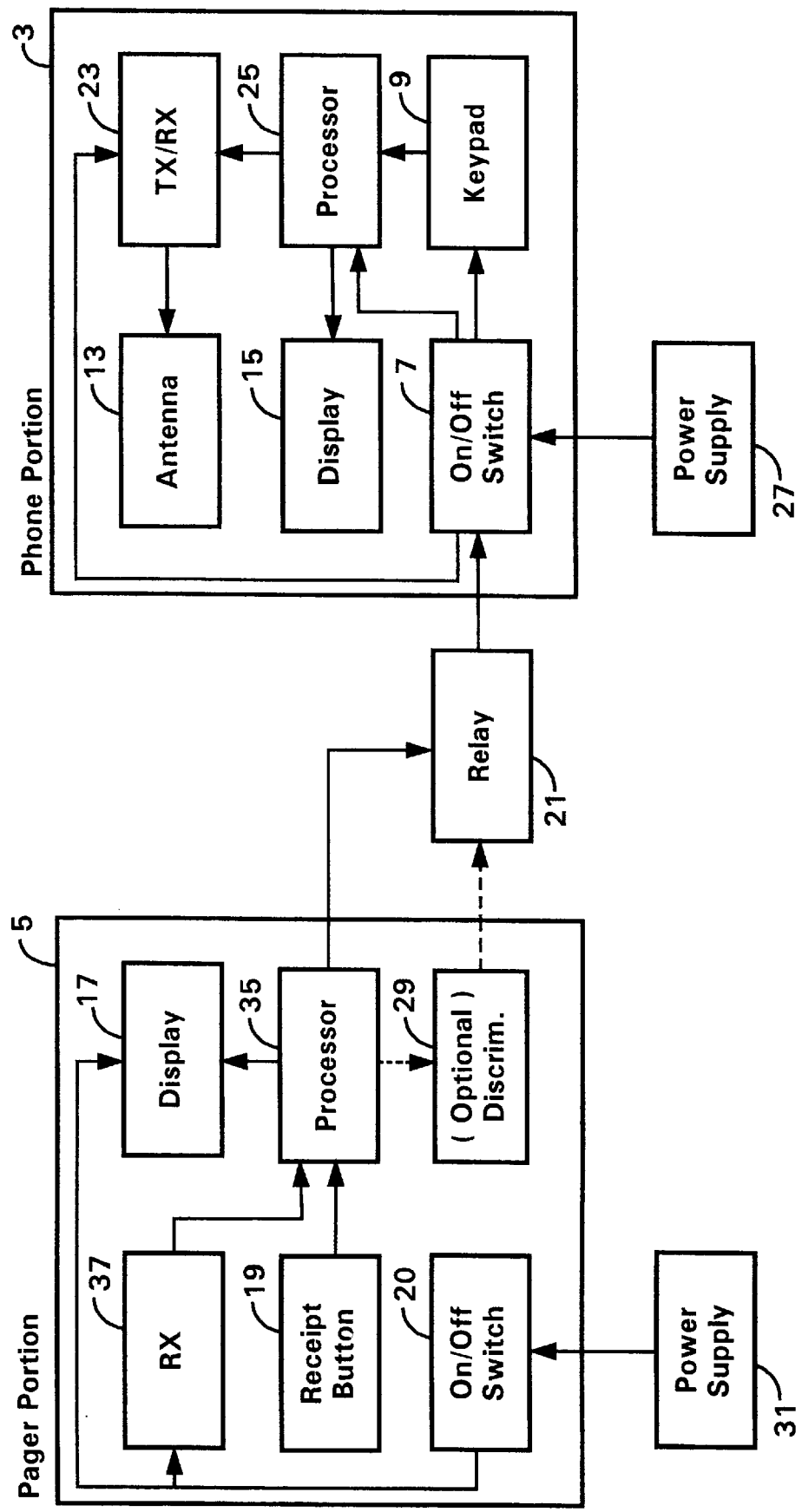
FIG. 3 is a high level block diagram of, the components of the combined mobile phone/pager of FIGS. 1 and 2.

Referring now to FIG. 3, there is shown a high level block diagram of the components of the combined mobile phone/pager of the present invention. For the most part, the components are shown grouped into two blocks representing the mobile phone portion 3 and the pager portion 5. In the mobile phone portion, the on/off switch 7 is shown connected between the power supply 27, the keypad 9, display 15, transmitter/receiver 23 and processor 25. Thus, by pressing the on/off switch 7, the components of the mobile phone portion 3 may be activated. The on/off switch 7 is also connected to the relay 21, which functions to turn on the on/off switch 7 upon receipt of a paging signal by the pager portion 5. The pager portion 5 is a regular pager, and may include a display 17, a receipt button 19 and may include a discriminator 29. The pager portion 5 further includes a pager processor 35 to process the incoming paging signal and to store the paging signals if necessary. A receiver 37 is provided in the pager portion 5 to receive the paging signals. The discriminator may be added to allow use of the pager portion 5 and the mobile phone portion 3 independently. For doing so, a Mobile Paging Signal Indication Component (M.P.S.I.C.) may be added to the paging signal. The optional discriminator 29 detects and verifies that the paging signal includes the M.P.S.I.C. before activating the relay 21 and turning on the mobile phone portion 3. If the M.P.S.I.C. is not present in the paging signal, the paging signal is treated as an ordinary paging signal and the mobile phone portion 3 is not turned on. To compensate when the power supply 27 of the mobile phone portion 3 is dead, the pager portion 5 may have an independent power supply 31, which allows the pager portion 5 to keep receiving paging signals and storing the phone number of the incoming calls, even when the power supply 27 of the mobile phone portion 3 is dead. The pager power supply 31 is connected to the pager portion through on/off switch 20.

Referring now to FIG. 4, there is shown a second embodiment of the combined mobile phone/pager of the present invention. In this second embodiment, the pager portion is integrated inside the mobile phone portion 3. To display the messages received by the pager portion to a user, a pager button 33 is added to the mobile phone portion 3. The display may be shared between the phone portion and the pager portion. Upon depression of the pager button 33, the paging message is presented on the display 15 of the mobile phone portion 3. The pager button 25 has similar functions to functions of pagers of the art, or other functions may be added as well. The display 15 may also be utilized to show the phone number of the calling party from which an incoming paging signal is received.

Referring now to FIG. 5, there is shown a partially cut side elevational view of the second embodiment of the mobile phone/pager of FIG. 4. As for the first embodiment, the integrated pager portion 5 is connected to the relay 21, which is also connected to the on/off switch 7 of the mobile phone portion 3. The mobile phone portion 3 also has, as for the first embodiment, the transmitter/receiver 23, the processor 25 and the power supply 27.

Figure 6:
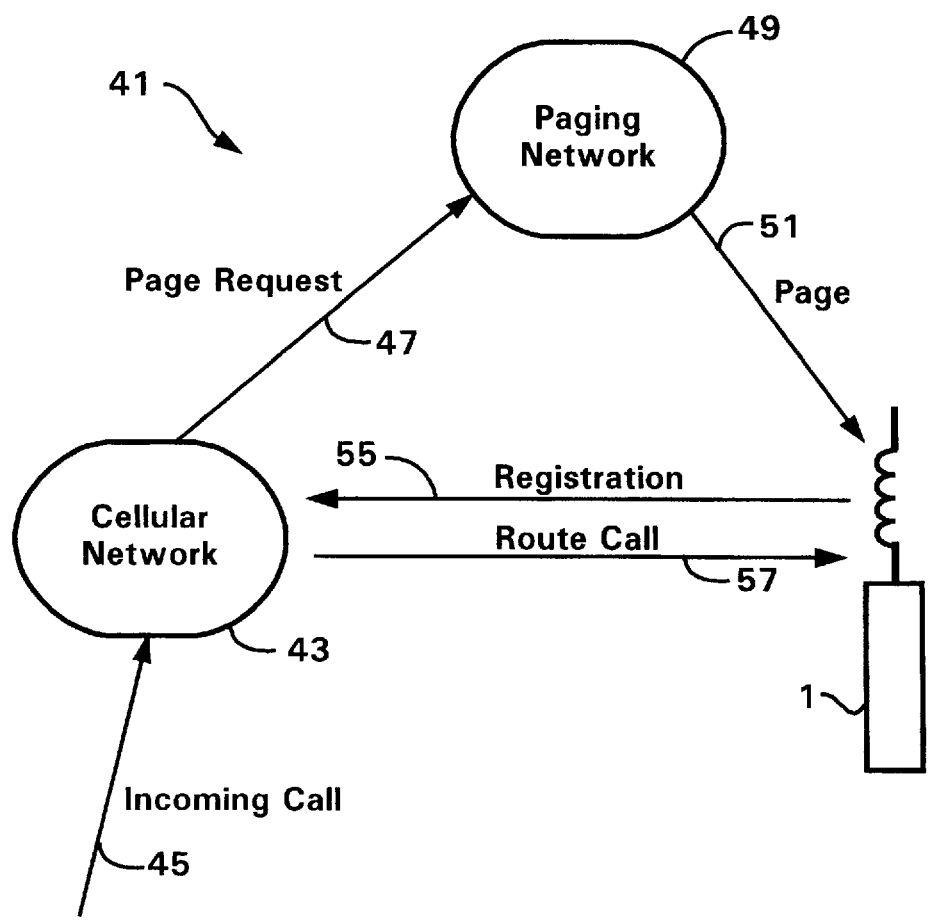
FIG. 6 is a block diagram of a combined mobile phone and pager network of the present invention.

Referring to FIG. 6, there is shown a radio telecommunications network 41 in which the combined mobile phone/pager 1 of the present invention may be implemented. The radio telecommunications network 41 includes a cellular network 43 and a paging network 49. When an incoming call 45 is received in the cellular network 43, the cellular network may attempt to contact the mobile phone portion 3. This attempt may be unsuccessful if, for example, the mobile phone portion 3 is in an inactive (off) status. If the mobile phone portion cannot be contacted in the cellular network 43, the cellular network sends a page request 47 to the paging network 49 to page the pager portion 5. The paging network 49 then generates and transmits a paging signal 51.

Upon receipt of the paging signal 51, the pager portion 5 activates the mobile phone portion 3. This activation may be accomplished through a relay switch, the switch being a mechanism that causes activation of a secondary device from a first device. Upon activation, the mobile phone portion 3 sends a registration message 55 to the cellular network 43 which then routes the incoming call 45 to the mobile phone portion 3 in the normal manner.

Figure 7:
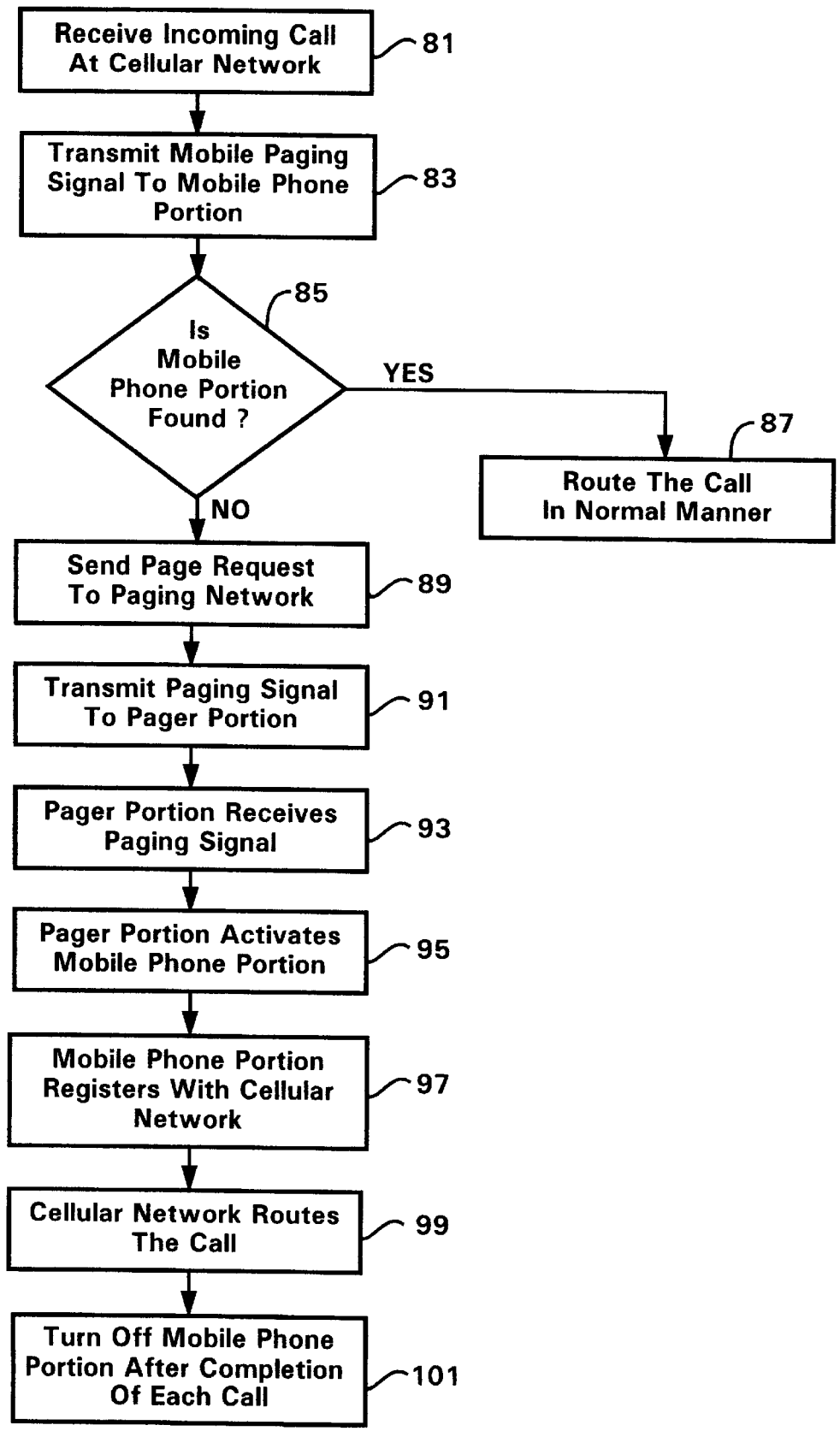
FIG. 7 is a flow chart illustrating the steps involved when the pager activates the mobile phone in accordance with the teachings of the present invention.

Referring now to FIG. 7, there is shown a flow chart of the method of the present invention. The method activates the mobile phone portion 3 of a combine mobile phone/pager 1, having the on/off switch 7 connected to the pager portion 5 through the relay 21. At step 81, an incoming call 45 for the mobile phone portion 3 is received at the cellular network 43. Upon receipt of the incoming call 45, the cellular network 43 transmits a mobile paging signal to the mobile phone portion 3 at step 83, in an attempt to locate the mobile phone portion in the cellular network coverage area. If the mobile phone portion is found at step 85, a page response from the mobile phone portion 3 is received and the cellular network routes the call to the mobile phone portion in the normal manner at step 87.

If the mobile phone portion is not found at step 85, no page response is received, and the phone portion 3 is presumed to be in an off status. At step 89, the cellular network sends a page request to the paging network 49. At step 91, the paging network then transmits a paging signal to the pager portion 5 which is received in the pager portion at 93. The paging signal may either be a standard paging signal (i.e. the phone number of the calling party), as is known in the art, or a paging signal having a Mobile Paging Signal Indication Component (M.P.S.I.C.).

At step 95, the pager portion activates the mobile phone portion. In one embodiment, the pager portion determines whether or not the M.P.S.I.C. is present in the paging signal. If the M.P.S.I.C. is not present, the paging signal is treated as an ordinary paging signal, and the user is notified of the calling number by the pager portion 5. However, if the M.P.S.I.C. is present, the mobile phone portion 3 is activated through relay 21.

At step 97, the mobile phone portion 3 sends a power-up registration message to the cellular network. The cellular network then routes the call to the mobile phone portion in the normal manner. Finally, at step 101 the mobile phone portion 3 is turned off after the completion of each call to conserve battery power. Alternatively, the mobile phone portion 3 may be constructed so that pressing the end button 11 turns off the mobile phone portion 3.

Network Support for the Combined Mobile Telephone and Pager

This section describes in detail how the nodes in the cellular network 43 interact in order to support operation of the combined mobile telephone and pager 1. The description utilizes nomenclature from the IS-41 Intersystem Signaling Standard, however, the invention is not limited to using IS-41, and any suitable intersystem signaling protocol may be utilized within the scope of the present invention.

Modifications are required to the cellular network in order to support call delivery using the combined mobile telephone and pager. A new class is introduced in the mobile subscriber's profile in the home location register (HLR). The class indicates that the mobile station is capable of receiving standard paging messages. Upon receiving a standard paging message, the pager portion of the combined mobile telephone and pager activates the mobile telephone portion. A power-up registration message is then sent from the mobile telephone to the serving mobile switching center (MSC).

There are two separate phases of call delivery in the process of the present invention. First, when a location request message is received in the HLR, the subscriber's activity status is checked. If the subscriber is inactive, then the paging class of the subscriber is checked. If the paging class indicates that the subscriber is a dual pager/mobile telephone subscriber, a paging request message is sent from the HLR to the paging network via a data link. The paging network takes the appropriate action, as is known in the art, to send a Standard paging message to the mobile station. The HLR also records the call delivery attempt in a "Page-In-Progress" (PIP) list for a certain period of time. If a registration message is not received from the mobile station in the HLR within this time period, the record in the PIP list is discarded. Normal actions are then taken to terminate the call.

If the subscriber's paging class in the HLR indicates that the subscriber is not a dual pager/mobile telephone subscriber, and the mobile station is not capable of receiving standard paging messages, then the call is also terminated normally.

The second phase of call delivery begins when a registration message is received from the mobile station in the HLR. Once again, the subscriber's paging class is checked in the subscriber's profile in the HLR. If the paging class indicates that the subscriber is a dual pager/mobile telephone subscriber, then the PIP list is checked to determine whether a call delivery is pending for the subscriber. If there is a call waiting to be routed to the subscriber, the following action is taken. A registration update is performed in the HLR in the normal manner including sending a registration notification return result message to the visited MSC. Also, the call in progress is removed from the PIP list, and call delivery continues in the normal manner with a roamer routing number requested from the V-MSC. If there is no call waiting to be routed to the subscriber, the registration update is performed in the normal manner. Also, if the subscriber's paging class in the HLR indicates that the subscriber is not a dual pager/mobile telephone subscriber, and the mobile station is not capable of receiving standard paging messages, then the registration update is performed in the normal manner.

This supporting network allows for the introduction of the combined mobile telephone and pager into the radio telecommunications network.

Figure 8:
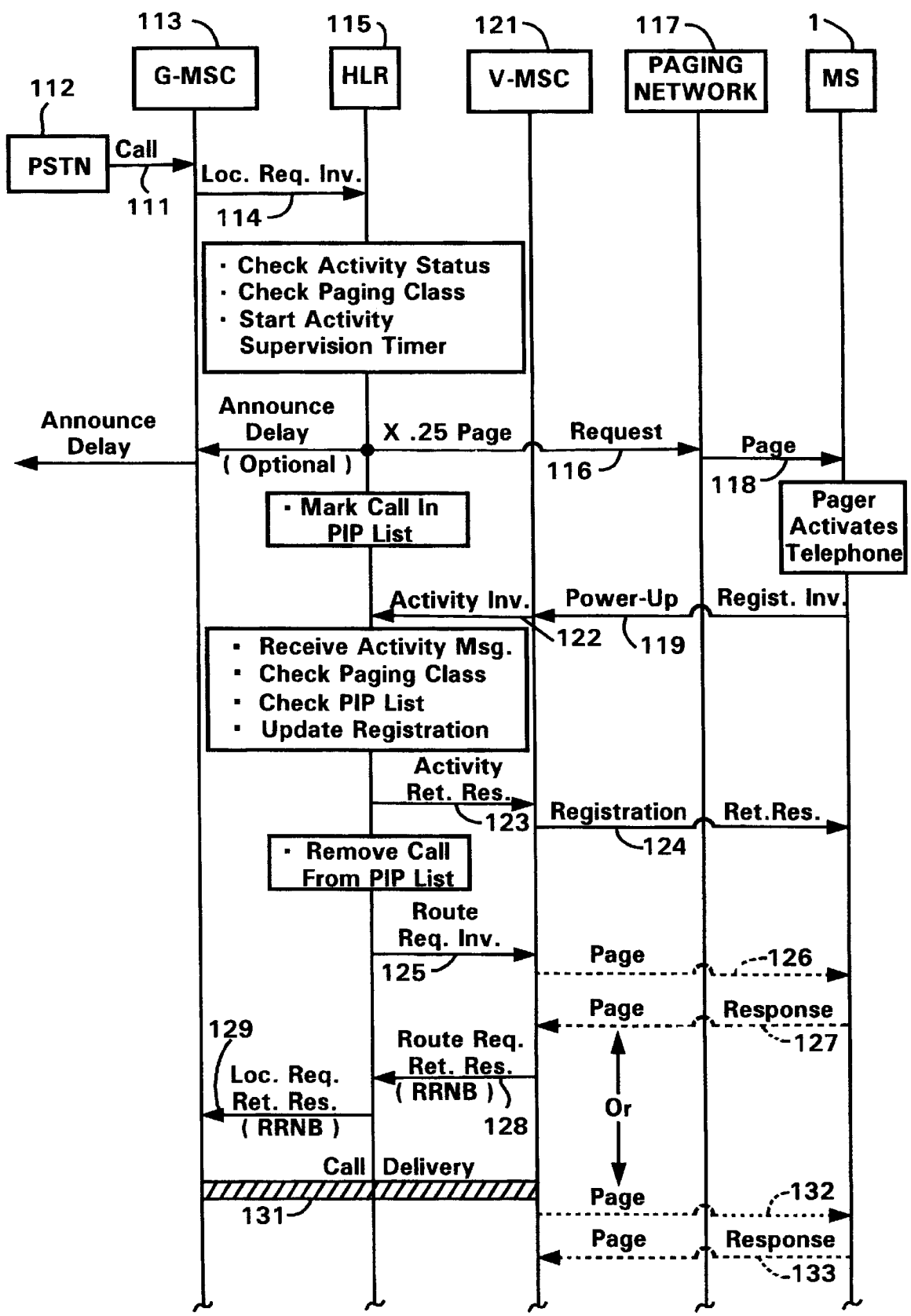
FIG. 8 is a signaling diagram illustrating the signaling messages in another embodiment sent between various nodes of a cellular network and a paging network when delivering an incoming call to a combined mobile telephone and pager in which the mobile telephone portion is inactive, and the mobile subscriber has moved into a visited exchange.

FIG. 8 is a signaling diagram illustrating the signaling messages in another embodiment sent between various nodes of a cellular network and a paging network when delivering an incoming call to a combined mobile telephone and pager in which the mobile telephone portion is inactive, and the mobile subscriber has moved into a visited exchange. This process enables the mobile telephone portion 3 to be turned off while only the pager portion 5 is energized. This increases the mobile station's standby time to approximately the battery life of a pager, and always provides the maximum talk time from the mobile telephone battery. The process and network modifications described herein enable operation of a standard mobile telephone and standard pager connected by a relay that activates the mobile telephone upon the receipt of a paging signal through the pager. The signals illustrated herein reflect intersystem signaling utilizing the IS-41 intersystem signaling protocol which is hereby incorporated by reference herein.

An incoming call 111 from the public switched telephone network (PSTN) 112 to a mobile station 1, comprising a combined mobile telephone and pager, is received in the cellular network in a gateway mobile switching center (G-MSC) 113. The G-MSC sends a Location Request Invoke message 114 to a HLR 115 associated with the subscriber number (SNB) of the mobile station 1. The HLR 115 determines whether the mobile station 1 is in an active or an inactive status. If inactive, the HLR checks the paging class of the mobile subscriber to determine whether the subscriber is a dual pager/mobile telephone subscriber, and thus the mobile station is capable of receiving standard paging messages. The HLR also starts an activity supervision timer. If the subscriber is a dual pager/mobile telephone subscriber, the HLR then sends a page request 116 to a paging network 117. This request may be sent by, for example, an X.25 datalink network as is known in the art. Optionally, the HLR may simultaneously signal the G-MSC to announce a potential delay in call delivery. The G-MSC may then announce the potential delay to the calling subscriber notifying him that call setup may be delayed while locating the called subscriber. The HLR then creates a record for the call in the PIP list.

The paging network then sends a page 118 to the mobile station 1 where the pager portion 5 receives the page and activates the mobile telephone portion 3. The mobile station 1 then sends a power-up registration invoke message 119 to the visited mobile switching center (V-MSC) 121 where the mobile station is currently operating. The V-MSC checks its subscriber records and, if the mobile station has not previously registered in the V-MSC, does not find the subscriber. The V-MSC then sends an activity message 122 to the HLR 115 where the status of the mobile station is changed to active. The HLR then performs a registration update and returns an activity message return result message 123 to the V-MSC 121 which sends a registration return result message 124 to the mobile station.

The HLR then determines whether the activity message 119 is from a dual pager/mobile telephone subscriber, and if so, checks the PIP list to determine if a call delivery is pending for this mobile station. If a page-in-progress is found (i.e., a call is waiting to be routed) the HLR removes the page record from the PIP list. The HLR then sends a Routing Request Invoke message 125 to the V-MSC 121. The V-MSC pages the mobile station at 126 and receives a page response at 127 in order to place the mobile station on a voice channel. The V-MSC then sends a Routing Request Return Result message 128 with a roamer routing number (RRNB) (i.e., temporary location directory number (TLDN)) to the HLR 115. The HLR then sends a Location Request Return Result message 129 with the RRNB to the G-MSC 113. The G-MSC 113 then routes the call to the V-MSC 121 and the mobile station at 131. Alternatively, the paging process from the V-MSC 121 to the mobile station 1, and establishment of the voice channel, may be performed at 132 and 133 after the call is routed to the V-MSC at 131.

If the HLR does not receive an indication that the mobile station is active before the activity supervision timer expires, the process is halted and the record in the PIP list is discarded. A Location Request Return Result message is then sent to the G-MSC 113 indicating that the mobile station was not found. The HLR may receive an indication that the mobile station is active through, for example, an activity message indicating a power-up registration by the mobile station.

Figure 9A:
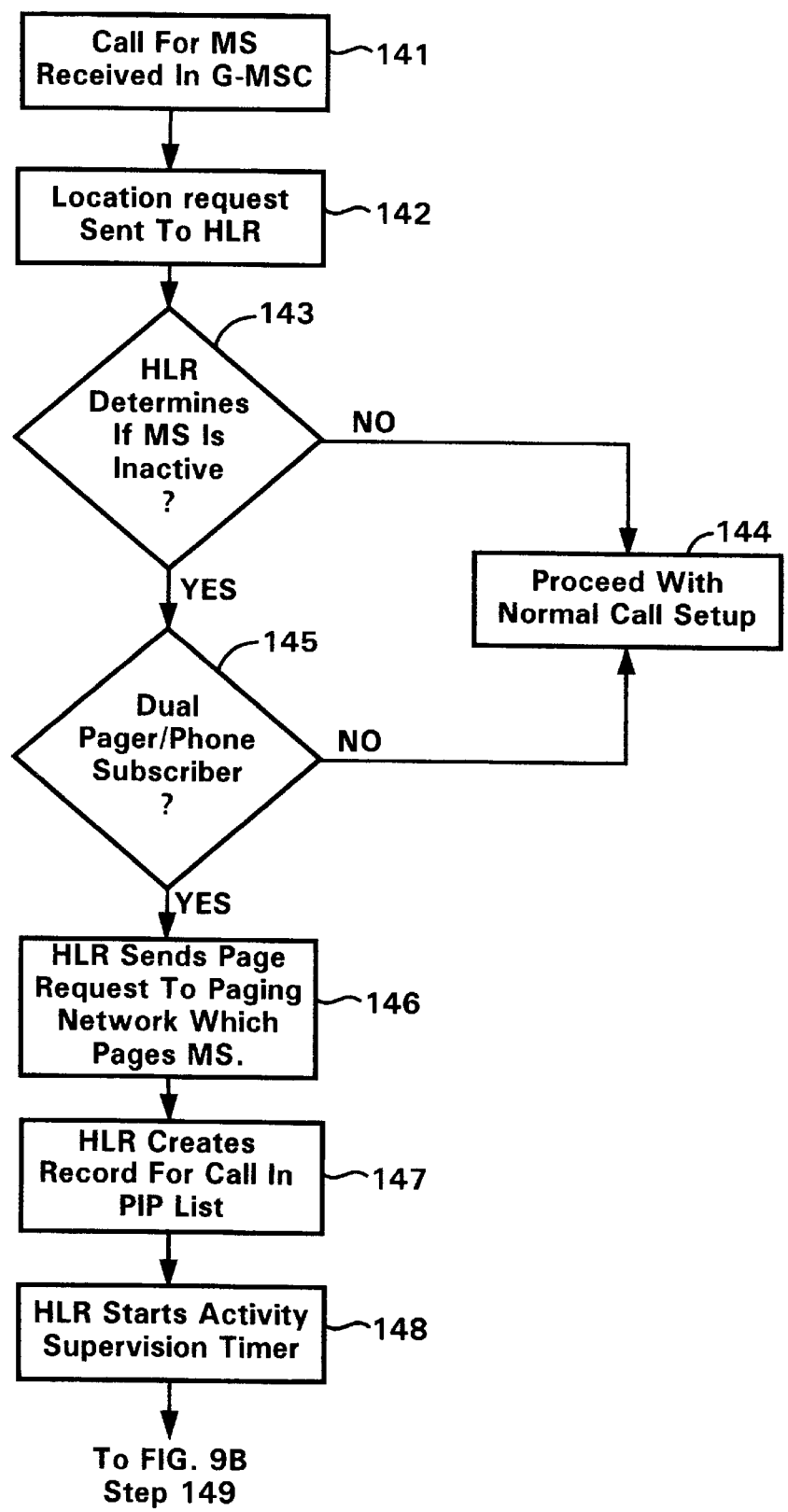
FIGS. 9A–9C are a flow chart illustrating the steps involved in the process by which a radio telecommunications network, modified in accordance with the teachings of the present invention, supports operation of a combined mobile telephone and pager.
Figure 9B:
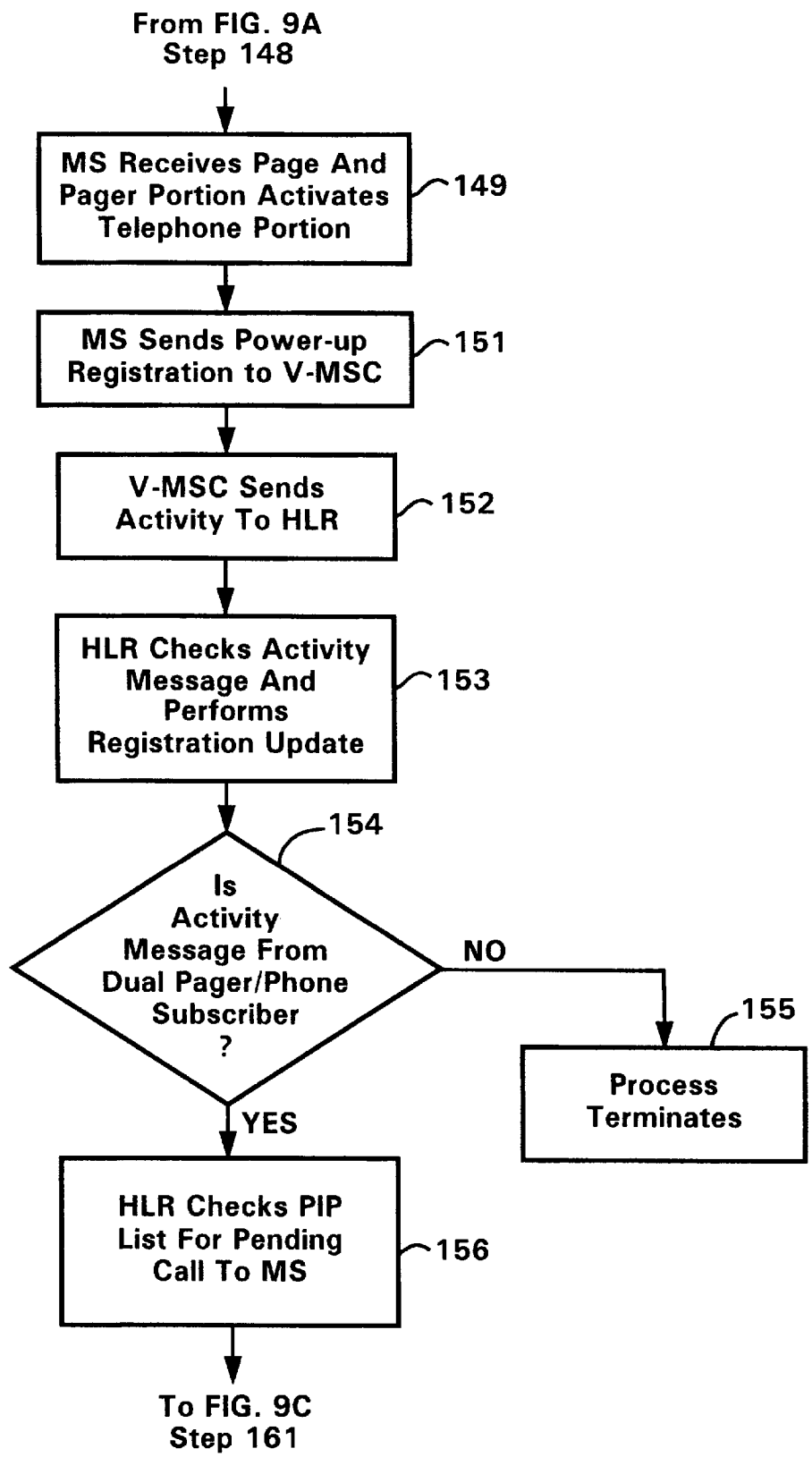
Figure 9C:
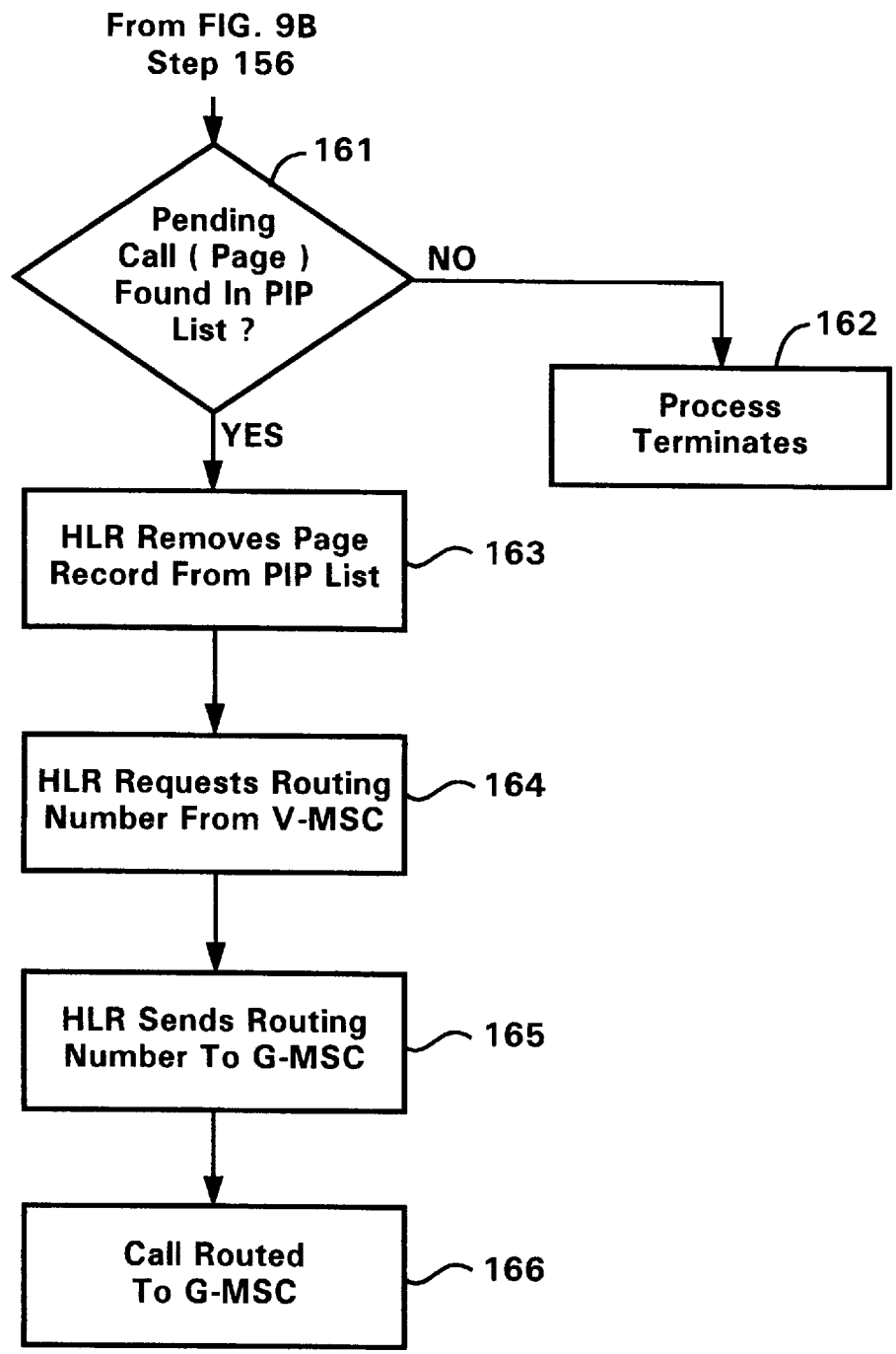

FIGS. 9A–9C are a flow chart illustrating the steps involved in the process by which a radio telecommunications network, modified in accordance with the teachings of the present invention, supports operation of a mobile station comprising a combined mobile telephone and pager. The radio telecommunications network includes a cellular network and a paging network. The process begins at step 141 where a call for the mobile station is received in a gateway mobile switching center (G-MSC). At 142, the G-MSC sends a location request to the HLR associated with the mobile station. At step 143, the HLR determines whether or not the mobile station is in an inactive status. If not (i.e., the mobile station is active), the process moves to step 144 where the cellular network proceeds with normal call setup. If, however, it is determined that the mobile station is inactive, then the process moves to step 145 where the HLR determines whether or not the called mobile station belongs to a subscriber in a dual pager/phone class. If not, the process returns to step 144 where the cellular network proceeds with normal call setup. If, however, it is determined that the subscriber belongs to the dual pager/phone class, then the process moves to step 146 where the HLR sends a page request to the associated paging network. The page request may be sent via X.25 datalink or other suitable means. The paging network then pages the mobile station.

At step 147, the HLR creates a record for the call in a page-in-progress (PIP) list, and starts an activity supervision timer at 148. The process then moves to FIG. 9B, step 149 where the mobile station receives the page from the paging network, and the pager portion of the mobile station activates the mobile telephone portion.

The mobile station then sends a power-up registration message to the visited mobile switching center (V-MSC) in which the mobile station is operating at step 151. At step 152, the V-MSC sends an activity message to the HLR. The HLR checks the activity message at 153 and performs a registration update.

The process then moves to step 154 where it is determined whether or not the activity message received in the HLR is from a dual pager/phone subscriber. If not, the process moves to step 155 where the process terminates. If the activity message received in the HLR is from a dual pager/phone subscriber, then the process moves from step 154 to step 156 where the HLR checks the PIP list for a pending call to the mobile station, and then moves to step 161 of FIG. 9C.

At step 161, it is determined whether or not a pending call (page) is found in the PIP list. If not, the process moves to step 162 where the process terminates. If a pending call is found in the PIP list, then the process moves from step 161 to step 163 where the HLR removes the page record for the call from the PIP list. At 164, the HLR requests a roamer routing number (RRNB) or temporary location directory number (TLDN) from the V-MSC. At 165, the HLR sends the routing number to the G-MSC which routes the call to the V-MSC at 166.

If, at any time in the process, the activity supervision timer expires, the process is halted, and the call record is discarded from the PIP list. The HLR then notifies the G-MSC that the mobile station was not found.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network having a cellular network and a paging network, a method of delivering a telephone call to a mobile station having a telephone portion, a pager portion, and a relay switch between said telephone portion and said pager portion, said method comprising the steps of:

recording in a home location register (HLR) associated with said mobile station, data indicating that said mobile station is capable of receiving standard paging messages from said paging network;

receiving said telephone call in said cellular network;

determining whether said mobile station is inactive;

determining from said data in said HLR whether said mobile station is capable of receiving standard paging messages, upon determining that said mobile station is inactive;

requesting said paging network to page said pager portion of said mobile station by sending a page request on a datalink from said cellular network to said paging network, upon determining that said mobile station is capable of receiving standard paging messages;

receiving, in said pager portion, said page from said paging network;

activating said telephone portion through said relay switch in response to receiving said page in said pager portion; and routing said call to said mobile station.

2. In a radio telecommunications network having a cellular network and a paging network, a method of delivering a telephone call to a mobile station having a telephone portion, a pager portion, and a relay switch between said telephone portion and said pager portion, said method comprising the steps of:

recording in a home location register (HLR) associated with said mobile station, data indicating that said mobile station is capable of receiving standard paging messages from said paging network, said recording step including creating a class of subscribers in said HLR indentifying subscriber's with a dual mobile telephone/pager capability;

receiving said telephone call in said cellular network;

determining whether said mobile station is inactive;

determining from said data in said HLR whether said mobile station is capable of receiving standard paging messages, upon determining that said mobile station is inactive;

requesting said paging network to page said pager portion of said mobile station, upon determining that said mobile station is capable of receiving standard paging messages;

receiving in said pager portion, said page from said paging network;

activating said telephone portion through said relay switch in response to receiving said page in said pager portion; and routing said call to said mobile station.

3. The method of claim 2 further comprising, after the step of determining whether said mobile station is inactive, the step of routing said call to said mobile station upon determining that said mobile station is active.

4. In a radio telecommunications network having a cellular network and a paging network, a method of delivering a telephone call to a mobile station having a telephone portion, a pager portion, and a relay switch between said telephone portion and said pager portion, said method comprising the steps of:

recording in a home location register (HLR) associated with said mobile station, data indicating that said mobile station is capable of receiving standard paging messages from said paging network;

receiving said telephone call in said cellular network;

determining whether said mobile station is inactive;

determining from said data in said HLR whether said mobile station is capable of receiving standard paging messages, upon determining that said mobile station is inactive;

requesting said paging network to page said pager portion of said mobile station, upon determining that said mobile station is capable of receiving standard paging messages;

recording said call in a page-in-progress list;

receiving, in said pager portion, said page from said paging network;

activating said telephone portion through said relay switch in response to receiving said page in said pager portion; and routing said call to said mobile station.

5. The method of claim 4 further comprising, after the step of activating said telephone portion, the steps of:

sending a registration message from said mobile station to said cellular network;

determining whether said registering mobile station is capable of receiving standard paging messages; and checking said page-in-progress list to determine whether there is a pending call for said mobile station, upon determining that said registering mobile station is capable of receiving standard paging messages.

6. The method of claim 5 further comprising the steps of:

removing said call from said page-in-progress list; and routing said call to said mobile station upon determining that there is a pending call for said mobile station in said page-in-progress list.

7. A method of delivering a telephone call to an inactive mobile telephone located in a cellular network, said method comprising the steps of:

connecting said mobile telephone to a pager;

connecting said cellular network to a paging network;

receiving said call for said mobile telephone in said cellular network;

attempting to contact said mobile telephone in said cellular network;

sending a page request from said cellular network to said paging network, requesting said paging network to page said pager, upon failing to contact said mobile telephone in said cellular network;

sending a paging signal to said pager in said paging network;

activating said mobile telephone from said pager upon receipt of said paging signal;

sending a registration message from said mobile telephone to said cellular network upon activation of said mobile telephone; and routing said call to said mobile station, upon receiving the registration message in the cellular network.

8. The method of delivering a telephone call to an inactive mobile telephone of claim 7 wherein said step of connecting said mobile telephone to a pager includes connecting said mobile telephone to said pager with a relay switch that activates said mobile telephone upon receipt of a paging signal in said pager.

* * * * *